A. R. NELSON.
ELECTRICALLY WOUND AND SYNCHRONIZED STRIKING CLOCK.
APPLICATION FILED MAR. 2, 1917.

1,853,935.

Patented Sept. 28, 1920.
11 SHEETS—SHEET 3.

FIG. 3

INVENTOR
A. R. NELSON

BY
J. M. Wright
ATT'Y.

A. R. NELSON.
ELECTRICALLY WOUND AND SYNCHRONIZED STRIKING CLOCK.
APPLICATION FILED MAR. 2, 1917.

1,353,935.

Patented Sept. 28, 1920.
11 SHEETS—SHEET 5.

FIG 5

INVENTOR
A. R. NELSON

A. R. NELSON.
ELECTRICALLY WOUND AND SYNCHRONIZED STRIKING CLOCK.
APPLICATION FILED MAR. 2, 1917.

1,353,935.

Patented Sept. 28, 1920.
11 SHEETS—SHEET 7.

INVENTOR
A. R. NELSON

BY
F. M. Wright
ATT'Y.

A. R. NELSON.
ELECTRICALLY WOUND AND SYNCHRONIZED STRIKING CLOCK.
APPLICATION FILED MAR. 2, 1917.

1,353,935.

Patented Sept. 28, 1920.
11 SHEETS—SHEET 8.

INVENTOR
A. R. NELSON

A. R. NELSON.
ELECTRICALLY WOUND AND SYNCHRONIZED STRIKING CLOCK.
APPLICATION FILED MAR. 2, 1917.

1,353,935.

Patented Sept. 28, 1920.
11 SHEETS—SHEET 10.

INVENTOR
A. R. NELSON

BY F. M. Wright
ATT'Y

UNITED STATES PATENT OFFICE.

ANTON R. NELSON, OF SUSANVILLE, CALIFORNIA, ASSIGNOR OF ONE-HALF TO ISAAC KNOCH, OF SUSANVILLE, CALIFORNIA, AND ONE ONE-HUNDREDTH TO FRANCIS M. WRIGHT, OF SAN FRANCISCO, CALIFORNIA.

ELECTRICALLY WOUND AND SYNCHRONIZED STRIKING-CLOCK.

1,353,935.

Specification of Letters Patent. Patented Sept. 28, 1920.

Application filed March 2, 1917. Serial No. 152,043.

*To all whom it may concern:*

Be it known that I, ANTON R. NELSON, a citizen of the United States, residing at Susanville, in the county of Lassen and State of California, have invented new and useful Improvements in Electrically Wound and Synchronized Striking-Clocks, of which the following is a specification.

The present invention relates to electric striking clocks.

One object of the present invention is to provide a clock of this character the operation of which will be comparatively cheap. Heretofore, electric clocks have for the most part, used electric batteries as the motive power, but these are expensive and unreliable. In my present invention I use an electric light or power current both for operating and for synchronizing the clock, and do not require electric wires to be laid specially for this purpose. A further object is to provide a clock of this character in which sufficient power may be stored to actuate the clock for several days, so that the source of power may be turned off without affecting the running of the clock.

A further object is to provide such a clock in which the main spring is wound up every time the striking mechanism is in operation, so that a uniform rate of time keeping is maintained. A further object is to provide such a clock which can be operated by either A. C. or D. C. current of any standard voltage.

A further object is to provide a clock of this character which will be automatically protected against both high and low voltage.

A further object is to provide a clock of this character which can be sealed up for a period of several years so that the mechanism is protected from dust or climatic conditions.

A further object is to provide such a clock which is adapted to be mounted in cases of different designs, and which may be used either as an ordinary striking clock in dwelling houses or as an office clock, in which latter case the gongs, bells, and hammers, can be dispensed with if desired.

In the accompanying drawing.

Supported in a suitable clock case having a dial 1, is a clock frame, comprising front and rear main plates 3, 4, connected with, and spaced from, each other by upper and lower pairs of pillars 5, 6, in the usual manner. Supported by, and spaced from, the rear main plate 4 is an auxiliary plate 7.

Figure 1:
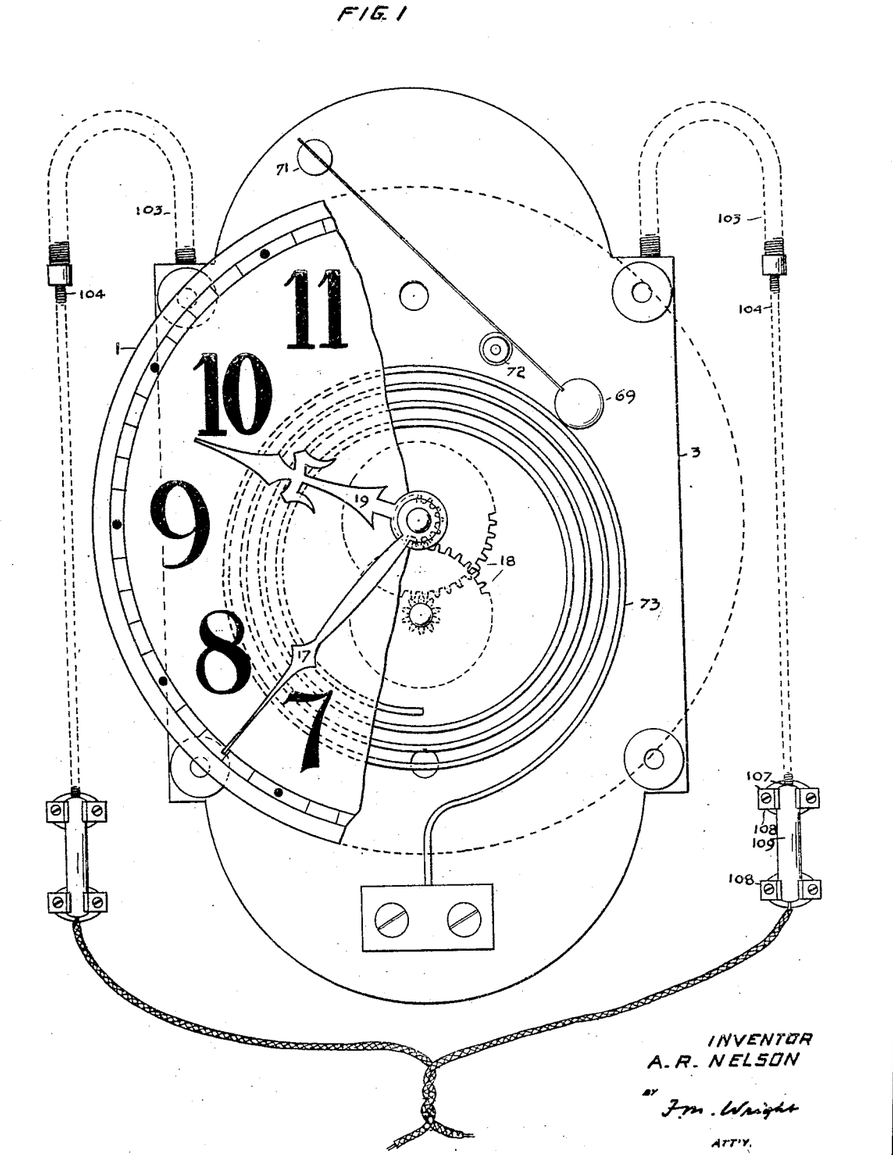
Figure 1 is a front view of the clock frame of my improved electric striking clock, showing also a portion of the dial thereof.
Figure 4:
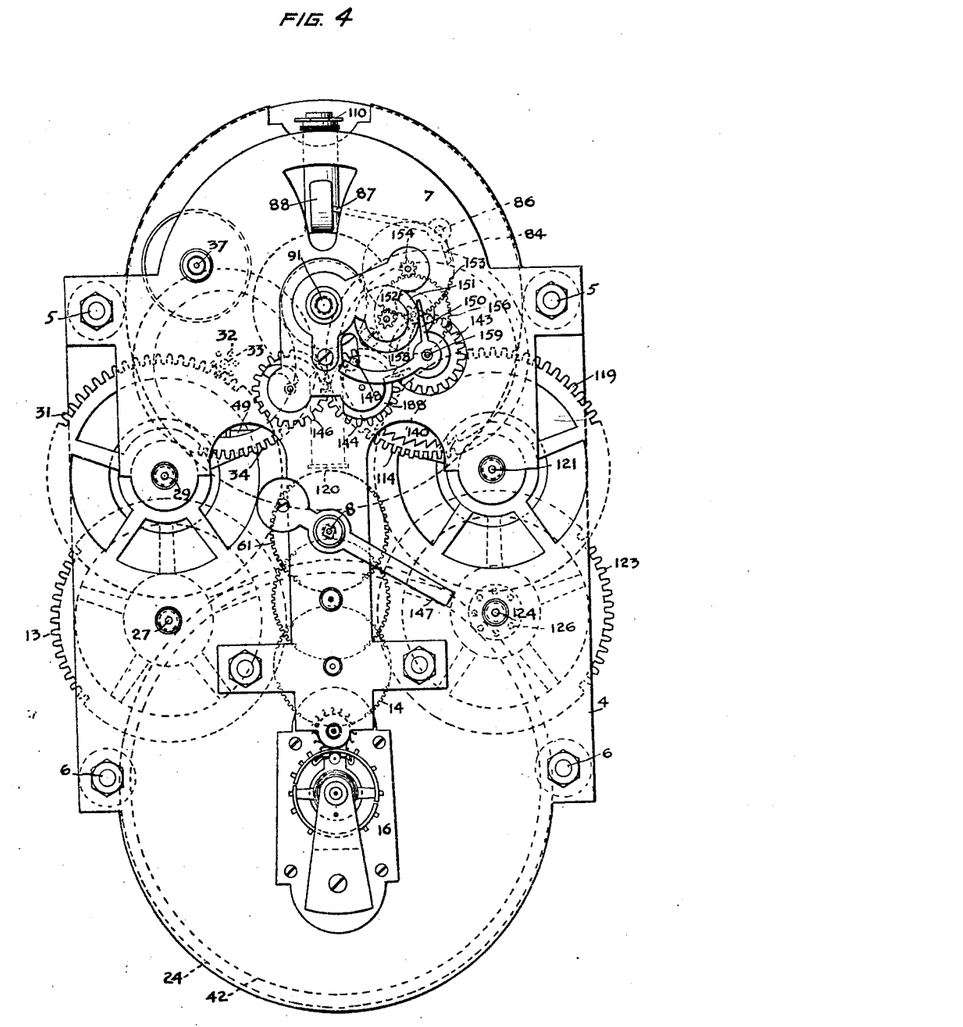
Fig. 4 is a rear view of said mechanism.
Figure 18:
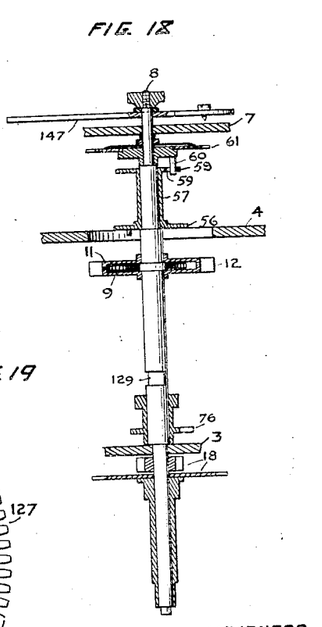
Fig. 18 is a sectional view showing the center arbor and parts immediately related thereto.

*Timing train.* — The timing mechanism comprises a center arbor 8 (Fig. 18) having secured thereto the inner end of a main spring 9 contained within a barrel 11, to which the outer end of the spring 9 is connected, said barrel having on its peripheral surface gear teeth 12 meshing with the second gear wheel 13 of a striking train, hereinafter described. Said barrel is therefore rotated, and the spring 9 is wound up, only when said striking train is operating, and is otherwise held stationary by the striking train. The motion of the center arbor is governed by a time train 14 (Figs. 2, 4) having a lever escapement 16. The center arbor 8 carries in the usual manner a minute hand 17 (Fig. 2) and, by a common motion construction 18 (Fig. 1) it imparts motion to an hour hand 19.

Figure 3:
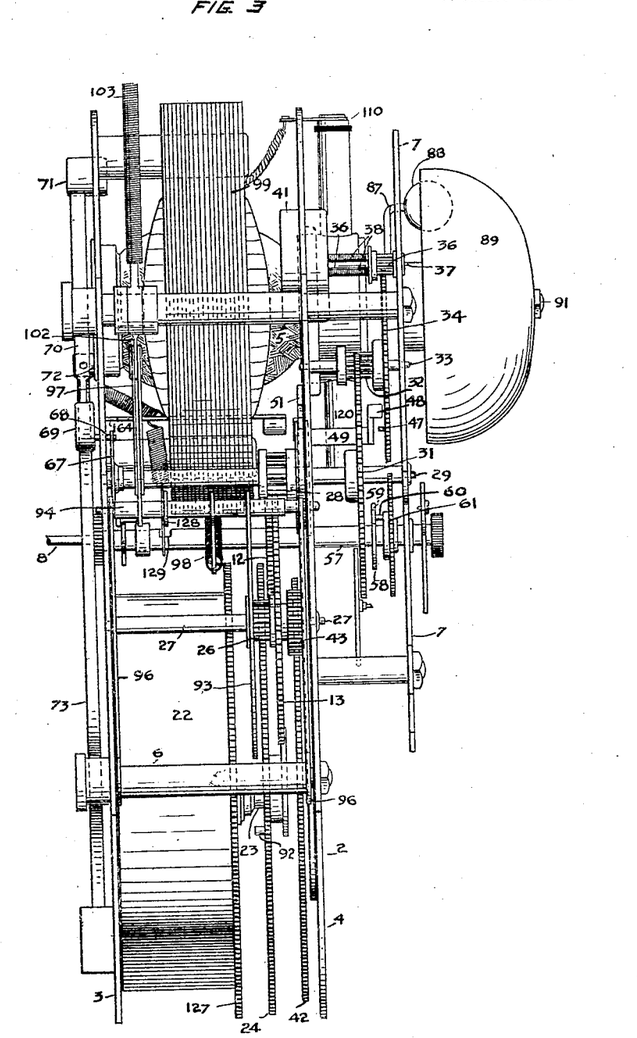
Fig. 3 is a broken view of the lefthand side of said mechanism.
Figure 5:
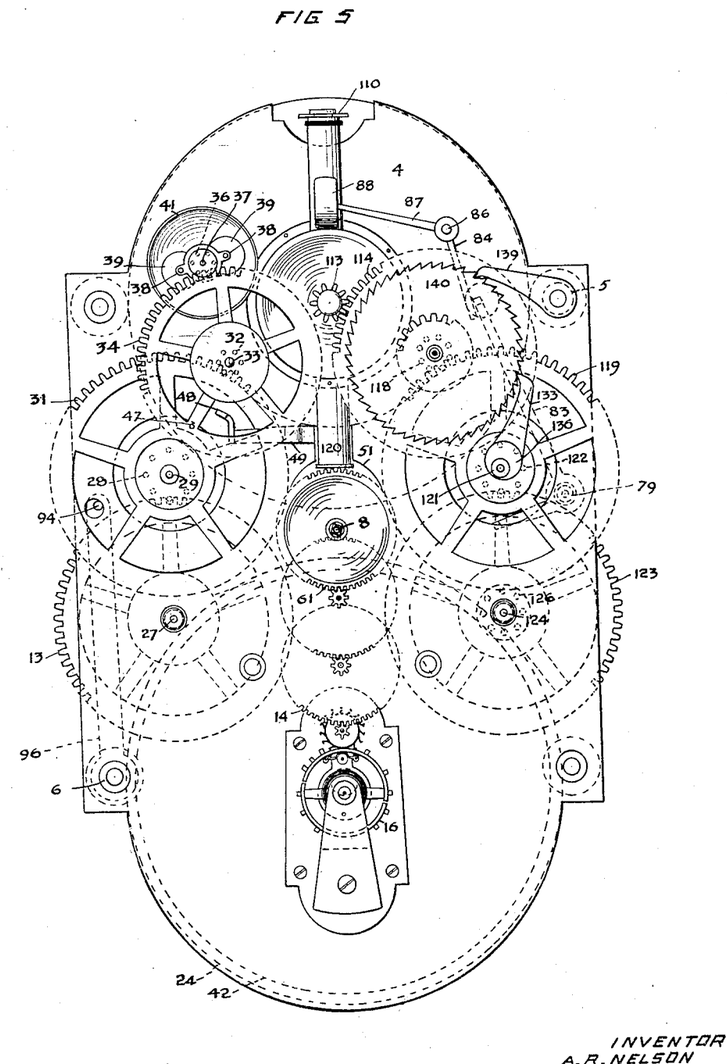
Fig. 5 is a rear view thereof; an auxiliary plate, and parts carried thereby, being removed.
Figure 6:
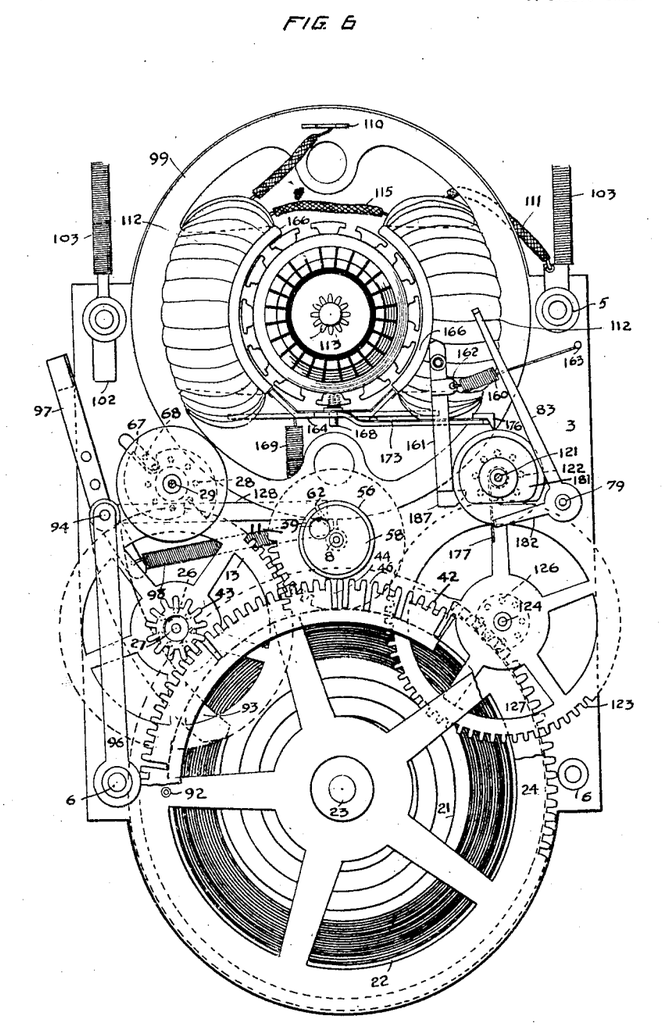
Fig. 6 is a rear view, a rear main plate and parts carried thereby being removed.
Figure 7:
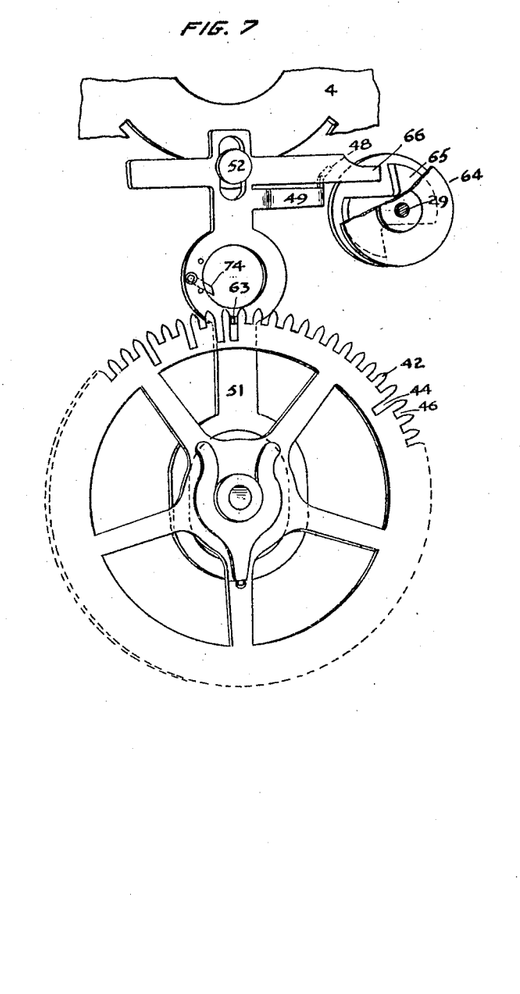
Fig. 7 is a perspective front view, showing parts of the clock immediately related to a striking mechanism.
Figure 8:
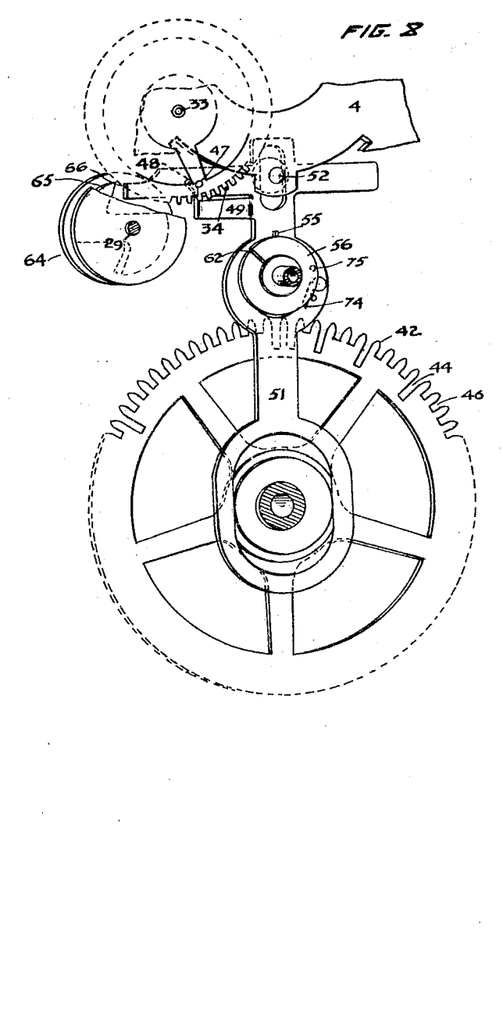
Fig. 8 is a perspective rear view of the same.
Figure 9:
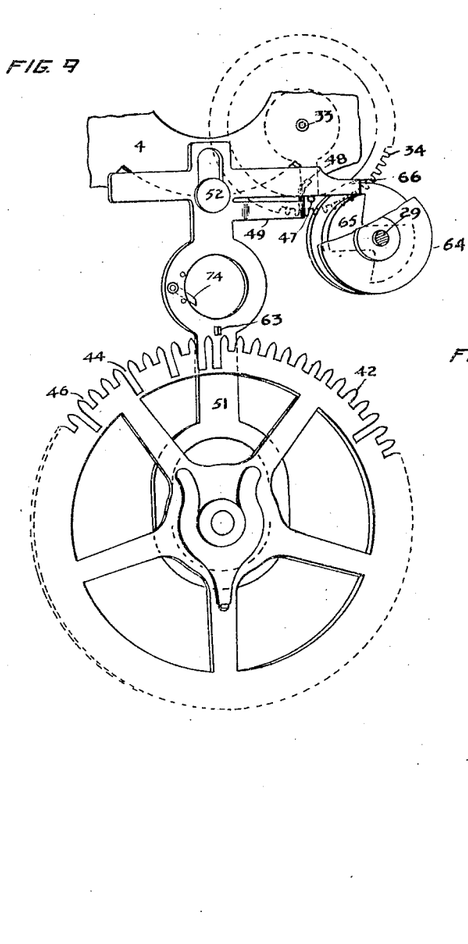
Figs. 9 and 10 are views similar to Fig. 7, showing the parts in other positions.
Figures 10, 11:
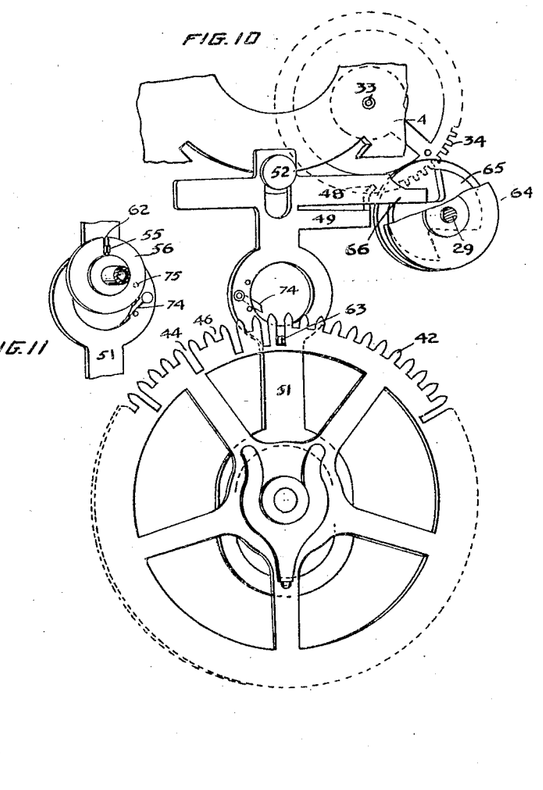
Fig. 11 is a perspective view of a releasing mechanism.

*Striking mechanism.*—21 (Fig. 6) indicates a power spring, contained within a barrel 22. The outer end of said spring is moved with said barrel under conditions hereinafter described, and the inner end is connected with a shaft 23, on which is secured a striking wheel 24, (Fig. 3) meshing with a pinion 26, on a shaft 27, carrying the gear wheel 13, (Figs. 4, 5) which meshes with a pinion 28 on a shaft 29 extending through the rear plate 4, and pivoted in the plates 3 and 7. Said shaft 29 carries, between the plates 4 and 7, a gear wheel 31, meshing with a pinion 32, of a shaft 33, carrying a gear wheel 34, meshing with a pinion 36, upon a shaft 37 extending between the plates 4 and 7, and carrying governor arms 38. Said arms consists of coiled springs, and carry weights 39 (Fig. 5), which, when the shaft 37 is rotated, are pressed by centrifugal force against a cylindrical wall 41 supported by the rear plate 4. By the action of the governor arms, the speed of the striking wheel is regulated.

Also loosely mounted on the shaft 23 is a counting gear wheel 42, (Fig. 6) of common construction, rotated by a pinion 43 secured upon the shaft 27, and having in its periphery (Figs. 7, 8, 9, 10) deep notches 44 and shallow notches 46. The deep notches are spaced from each other by progressively increasing sections of the periphery, in all of which, except the least, are series of shallow notches, said series increasing in number progressively from 1 to 11.

The striking wheel is normally prevented from rotating by the abutment against a pin 47 extending forwardly from the wheel 34 of a rearward projection 48, from an arm 49 extending through a hole in the rear plate 4, and formed on a slide-piece 51 vertically slidable closely adjacent to rear plate 4, being guided in its slidable movement by a shouldered screw 52, screwed into said rear plate 4, and extending through a vertically directed slot 53 in the upper portion of said slide-piece, and by a vertically directed slot 54 in the lower portion of said slide-piece, through which said shaft 23 extends with a close fit.

Said slide-piece is prevented from dropping by a pin 55 extending rearwardly therefrom, and resting upon a disk 56 secured to a tube 57 around the center arbor, said tube carrying a disk 58, having therethrough a hole 59, loosely engaged by a pin 60 extending forwardly from the center wheel 61 of the time train. By this mechanism the disk 56 is normally advanced with the center arbor, but is capable of advancing through a short distance independently thereof, for a purpose which will hereinafter appear. At the end of each hour a radially extending notch 62 in said disk 56 arrives below said pin 55, and, upon the exact hour, said pin drops into said notch, and a pin 63, which is in a corresponding deep notch 44 of the counting wheel 42, but not at the bottom of said notch, drops to the bottom, and thereby the rearward projection 48 from the slide-piece drops out of the way of the pin 47, thus permitting the striking train to operate under the action of the power spring.

On the shaft 29, which rotates about once in two seconds, is secured a grooved cam wheel 64, having a double cam 65, and in the groove is an arm 66 projecting from the slide-piece 51, so that, in each rotation of the shaft 29, (Fig. 9), the slide-piece is raised by means of said cam. It is so raised each time to a sufficient height to enable the pin 55 to clear the counting wheel, and the parts are so timed that, before it is again raised, the pin 55 drops into the next notch of the counting wheel. Also secured upon the shaft 29, adjacent to the rear surface of the plate 2, is a double cam 67, (Figs. 3, 6) which engages a pin 68, extending rearwardly from a hammer 69, (Fig. 1) carried by the free end of a spring arm 70, the other end of which arm is secured in a split post 71 on the front side of the front plate 3, said spring normally resting against a padded post 72. When said pin 68 is engaged by said cam 67, the hammer is raised from a gong 73, the outer end of which is secured upon the front plate 3, and, when the pin leaves the rise in the cam, said hammer drops again on to said gong. The hammer will rise, and then drop, and strike, as often as the pin 55 has just dropped into a shallow notch 46, but, if it then drops into a deep notch 44, the hammer cannot again rise, because the wheel 34 is stopped, by the arrest of the pin 47, (Fig. 8) by the projection 48, said projection being at the proper height to arrest said pin 47 because the notch 62 in the disk 56 has moved from below the pin 55. This removal has taken place because a finger 74, extending inwardly from the slide-piece 51, has engaged a pin 75 on the disk 56 and advanced it a short angular distance on the center arbor 8, the disk 56 being capable of this motion, as explained above. The pin 55 is now left in a position similar to that from which it started, in a deep notch, but not at the bottom of said notch, it being understood that the pin 47 escapes said projection 48 when the pin 55 is at the bottom of either a shallow or a deep notch, but is arrested thereby when it is at an intermediate depth.

Figure 2:
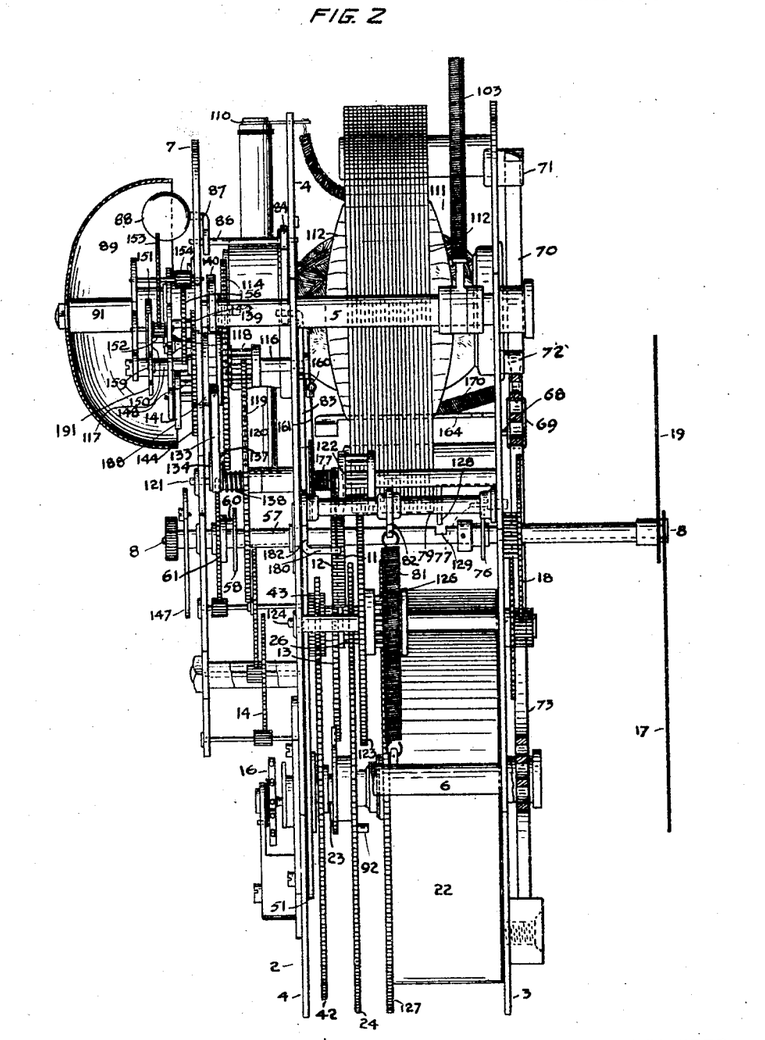
Fig. 2 is a view of the righthand side of the clock mechanism.
Figure 12:
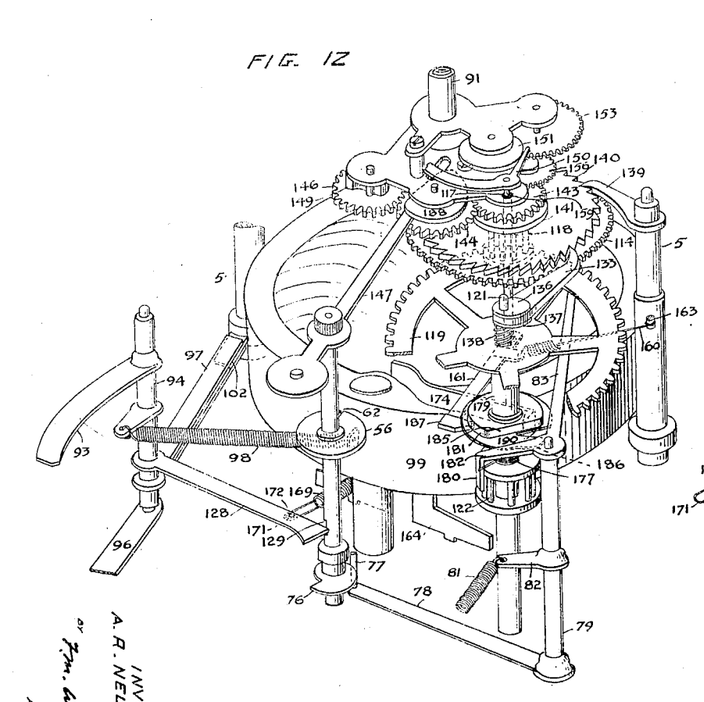
Fig. 12 is a perspective view, showing parts immediately related to a setting mechanism.
Figure 13:
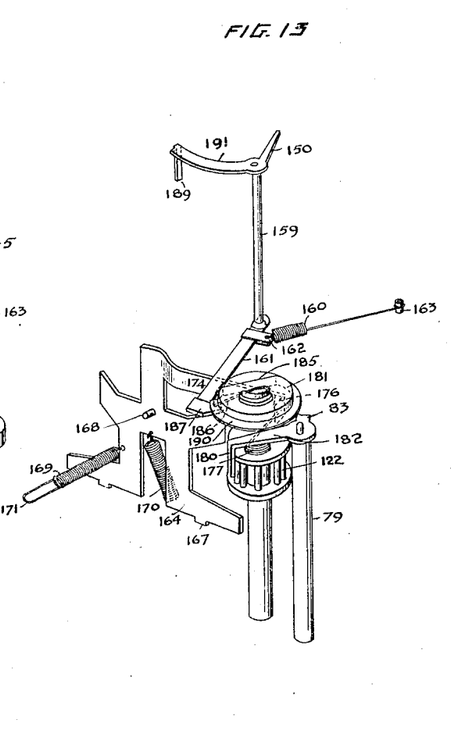
Fig. 13 is a similar view showing certain of these parts in a position different from that in Fig. 12.

*Half-hour striking.*—Secured upon the center arbor adjacent to the front plate 3 is a cam 76, (Fig. 12) which, at every half-hour, permits the drop of a pin 77 carried by the free end of an arm 78 secured to a shaft 79 and drawn down my means of a spring 81, secured at its lower end to a lower pillar 6, (Fig. 2). Said shaft also carries an arm 83, the free end of which extends through the rear plate 4 and engages an arm 84 on a shaft 86 carrying an arm 87, (Figs. 2, 3, 5) the free end of which extends through the auxiliary plate 7 and carries a hammer 88, which strikes a bell 89, the center of which is secured upon a post 91 extending rearwardly from the auxiliary plate 7.

*Winding mechanism.*—At 12 o'clock of each day, a pin 92, extending forwardly from the striking wheel 24, engages an arm 93, (Figs. 3, 6, 12) secured to a shaft 94, the ends of which are rotatably carried by arms 96 pivoted upon the other lower pillar 6, said shaft 94 also carrying a two-spring knife switch 97. As said pin 92 moves with the striking wheel, it turns said shaft 94 against the tension of a spring 98, of which one end is secured to the frame of a motor 99, supported on said front plate 3, and the other end of which arm is secured to said shaft. By moving said arm 93, the pin 92 gradually moves said knife switch 97 into contact with a knife contact 102 supported on, but insulated from, an upper pillar 5, and electrically connected to one of two wires 103, (Fig. 3) both supported on, but insulated from, the upper pillars 5, and which are adjustably connected to the tops of metallic posts 104, electrically connected, as shown at 107, with fuse contact members 108, which, with the other members, support fuses 109, and of which the other members are adapted to be connected with any suitable source of supply of electricity, as a power or light circuit, either A. C. or D. C., and of any ordinary voltage. The other wire 103, (Fig. 3) is electrically connected by an insulated wire 111, (Fig. 6) to one end of one field coil 112 of the electric motor 99, then from the other end of said coil by an insulated wire 115 to an end of the other coil 112 and the other end of said field coil is electrically connected to one brush 110, (Fig. 3) of the motor, the other brush 120 being connected to the clock frame 2 and thus electrically connected to the switch 97.

Figure 14:
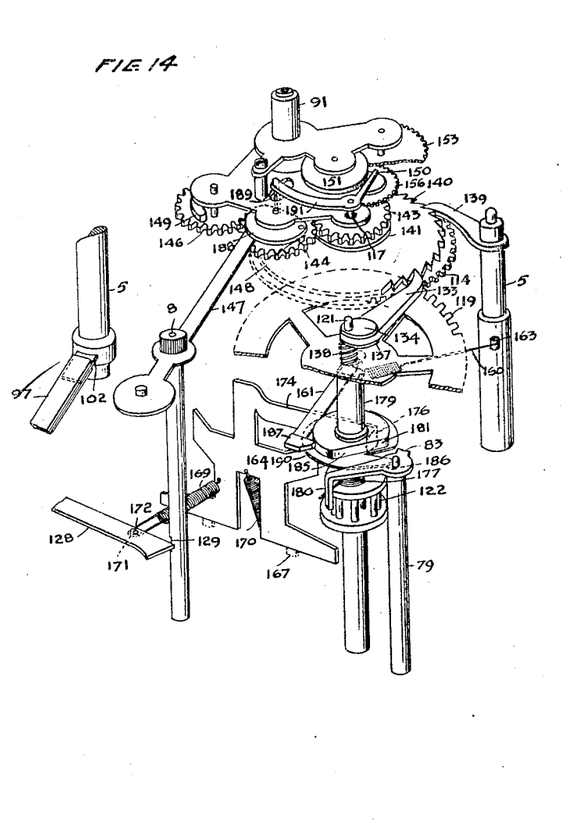
Figs. 14 and 15 are views similar respectively to Figs. 12 and 13, showing said parts in still other positions.
Figure 17:
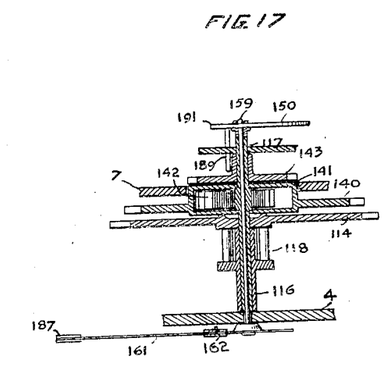
Fig. 17 is a similar view showing other parts thereof.
Figure 19:
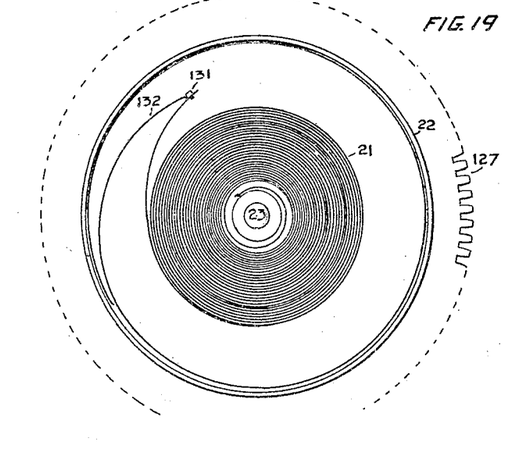
Fig. 19 is a side view of a main power spring and parts immediately connected therewith.

Thus, when the circuit is closed between the switch 97, (Fig. 12) and the knife contact 102, the motor is rotated. On the shaft of the motor is a pinion 113, (Fig. 5) which meshes with a gear wheel 114, on an outer tube 116, (Fig. 17) rotatable on a tube 117, (Figs. 2, 14) mounted in bearings in the rear plate 4, and auxiliary plate 7, said outer tube carrying also a pinion 118, (Fig. 5) which meshes with a gear wheel 119, secured to a shaft 121, which carries a pinion 122, which meshes with a gear wheel 123 on a shaft 124 and secured to a pinion 126, which meshes with a winding gear wheel 127, (Fig. 6) secured around the barrel 22, (Fig. 2). By means of the rapid rotation of the motor, the barrel is slowly rotated, winding up the outer end of the power spring 21, (Fig. 19).

This winding movement is arranged to continue until four minutes after 12 o'clock m. and the mechanism for accomplishing this result is as follows: The pin 92, (Figs. 6, 12) moves with the striking wheel, and pushes the arm 93, thereby turning the shaft 94. If the shaft 94 were stationarily supported, the pin 92 would be stopped when an arm 128 carried by said shaft 94 was arrested by the center arbor 8. But, by reason of the fact that the shaft 94 is not stationarily supported, but can move with the free ends of the arms 96, the effect of the pressure of the pin 92 upon the arm 93, when the arm 128 is arrested by the arbor 8, is now to move outwardly said arms 96 carrying said shaft 94, thus allowing the arm 128 to pass from above the center arbor 8 to below the same.

When the pin 92 escapes from the end of the arm 93, and the spring 99 tends to rock the shaft 94 to its normal position, it cannot do so, and thus break the circuit between the switch 97 and contact 102, (Fig. 12) for the arm 128 is held down by the center arbor 8. It cannot reverse its movements by which it was able to move from above the center arbor to below the same, for this movement was rendered possible only by the outward swinging of the arms 96, and there is not at this time any mechanism for effectig this outwardly swinging movement. But, at the expiration of four minutes, during which the switch 97 is closed, said arbor 8 has been turned into such a position that a flattened portion 129 thereof permits the free end of the arm 128 to pass which it then does instantaneously on account of the tension of the spring 98. The circuit is then instantaneously broken between the switch 97 and the knife contact 102.

The clock is supposed to be wound up every day and it is wound up for a period of four minutes each day in order to give time to synchronize the clock with a standard clock, allowing for a possible error in the running of the clock of two minutes, either fast or slow, during a period of several days, since it might happen that, from some cause or other, the winding was omitted during this time.

*Overwinding.*—Because the clock is wound for a period of four minutes, whereas two minutes each day is sufficient to wind the power spring on an average, I provide for the winding of the clock during this period of four minutes, without overwinding the power spring, in the following manner: The outer end of the power spring 21, (Fig. 19) is provided with a rivet 131, engaged by the inner end of a spring 132 of the same width and thickness as the power spring, but wound around same in the barrel in the opposite direction and through an angular distance of about 1¼ turns. The outer terminal portion of the spring 132 lies close against the inner surface of the barrel, and so does the inner portion if the power spring 21 is unwound, thereby causing great frictional resistance between the spring 132 and the inner surface of the barrel, and holding stationary the outer end of the power spring while the inner end thereof moves with the shaft 23 and the striking wheel secured thereon. But, when the power spring is fully wound, its outer end is drawn inwardly from the barrel, and therefore there is also drawn inwardly the inner end of the spring 132, thus causing said spring 132 to be out of contact with the inner surface of the barrel throughout the greater part of its length. The consequence is that, upon further attempting to wind the power spring, the spring 132 slips within the barrel, since only a portion of said spring contacts with said barrel. Thus, although power is applied to winding the spring 21 during a period of four minutes, yet, after the spring has been fully wound, which is done in about two minutes, no further winding takes place.

*Setting mechanism.*—The rotation of the wheel 119, (Figs. 2, 16) caused by the rotation of the motor produces a reciprocating action on a pawl 133, (Figs. 5, 14) carried by a disk 134, secured eccentrically to the shaft 121 and having a flange 136, against which the pawl is pressed laterally by a disk 137 slidable upon the shaft and pressed by a spring 138 compressed between the disk 137 and the central portion of the wheel 119. Said disk 137 engages the pawl 133 with such friction that the pawl always tends to rotate with the shaft 121 and thereby its tooth is kept in engagement with a ratchet wheel 140, the rearward movement of the ratchet wheel being prevented by a dog 139, mounted on an upper pillar 5, and which drops by gravity into the teeth of the ratchet wheel. Said ratchet wheel is loose on the inner tube 117, (Fig. 17) and in a barrel 141 forming part of said ratchet wheel is a mainspring 142, operatively connected thereto, in the same manner as was described for the power spring 21, the inner end of which spring 142 is being secured to the inner tube 117. The effect of the reciprocating motion of the pawl is, then, to wind up the setting mainspring 142, and, when the said spring is sufficiently wound, the rotary movement of the ratchet wheel can continue without said spring being overwound.

The spring 142 tends to turn a wheel 143 secured to the inner tube 117, which wheel 143 meshes with a gear wheel 144 (Figs. 4, 12, 14) meshing with an equal gear wheel 146, so that said wheels 144, 146, tend to turn in opposite directions at the same speed.

The purpose of said wheels 144, 146, is to turn the center arbor 8 in opposite directions respectively. With this object an arm 147 is secured on the center arbor at the rear of the clock and nearly corresponding in angular position with the minute hand of the clock. The gear wheel 144 has a pin 148 which engages said arm 147 on one side, and the gear wheel 146 has a projection 149 which engages it on the other side. If the clock is slow, all that is necessary is that the pin 148 on the gear wheel 144 should engage the arm 147 and move it forward to the exact position, this movement of the gear wheel taking place at two minutes after 12 o'clock, at noon, as will be hereinafter described. If the clock is fast the projection 149 upon the gear wheel 146 engages the arm 147 and moves it backward. But it is not sufficient that the projection 149 should move the arm 147 backward to its correct position, but it is necessary to move it beyond its correct position and then move it forward again beyond pin 147. The reason for this is that, whenever the minute hand, or the arm 147 is moved backward, the time train is also moved backward. But it is well known that there is a certain recoil when a train of wheels is moved backward, which brings the terminal member of the train forward slightly, as is observable in setting the minute hand of a clock back. If the minute hand be set to the exact position, it will be found, upon releasing it, that it springs forward from the exact position. In order to avoid this error the arm 147 is moved backward beyond the correct position, and is then moved forward again, to the correct position. This mechanism will be operative to move the arm 147 backward and then forward to its original position, even if the minute hand be absolutely correct.

Provision is made in the following manner whereby this setting action takes place at the proper time:—

Figure 15:
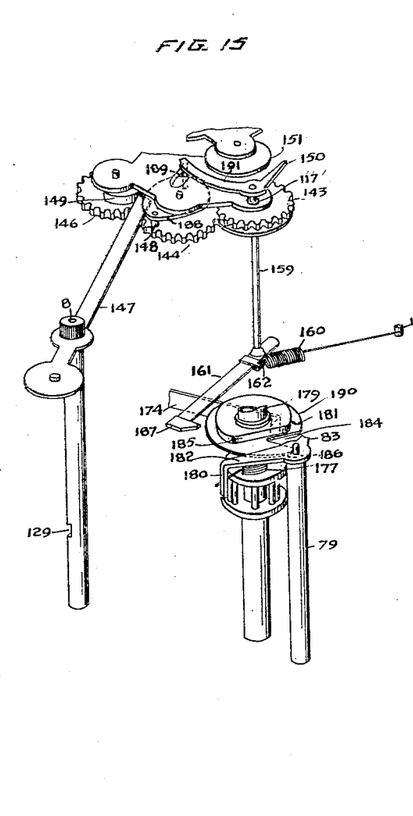

In the first place, it is necessary to hold the gear wheels 144 and 146 stationary until released from a distant synchronizing station. This is effected by means of a braking arm 150, (Figs. 14, 15, 17) which engages a brake wheel 151 on a shaft carrying a pinion 152, (Fig. 4) meshing with a gear wheel 153 on a shaft carrying a pinion 154 meshing with a gear wheel 156 on a shaft carrying a pinion 158 meshing with the gear wheel 143. A braking train is thus constituted by which a very rapid motion is imparted to the brake wheel 151 from a comparatively slow motion of the wheels 144 and 146.

Said braking arm 150 is secured to a shaft 159, which extends through the inner tube 117, and has its bearing in the plate 4, and on the end of said shaft in front of said plate 4 is secured a spring arm 161, to which is secured, as shown at 162 one end of a coiled spring 160 of which the other end is secured to a pin 163 upon the plate 4, which spring 160 tends to turn the shaft 159 in a direction such that the braking arm 150 presses against the brake wheel 151, and thereby holds said braking train stationary, and prevents the tube 117, and the inner end of the spring 142 connected therewith, from rotating and unwinding said spring 142.

Figures 20, 21, 22:
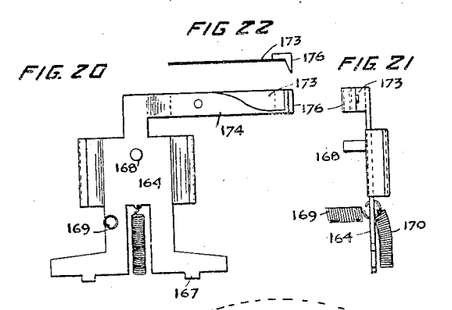
Fig. 20 is a front view of an armature.
Fig. 21 is a side view of the same.
Fig. 22 is a plan view of a spring carried by said armature.

164, (Figs. 14, 20) indicates an armature adapted to be attracted by field magnets 166 of the motor 99, pivoted, as shown at 167 to the plate 3, so that the side next the plate 4 can vibrate vertically, its vibration away from the field magnets being limited by a pin 168, which abuts against part of the field laminations. Said armature 164 is normally withdrawn from the field magnets by a spring 169, of which one end is connected to said armature 164, and the other end is formed into a loop 171 surrounding a shouldered pin 172 in the arm 128 before described. Consequently this spring can have no tension tending to pull the armature 164 away from the field magnets until the circuit has been closed, as a spring 170 tends to keep the armature against field of motor until said spring 169 has been placed under tension.

When the motor has been started to wind the clock, and the armature is being held against the field magnets, a spring arm 173, secured to a rigid arm 174 extending integrally from the armature, is held in such a position that a rigid finger 176 upon the outer end of said spring arm is adapted to arrest, and prevent further movement of the projecting free end of a spring 177 (Figs. 12, 14, 16) coiled around an enlarged portion of the shaft 121, the other end of said spring being secured to a tube 179 around the shaft 121 and formed integrally with a cam disk 181. Both said tube 179 and the spring 177 are entirely loose upon the shaft 121, but, by reason of the fact that the spring 177, after leaving the tube 179, is coiled around the shaft 121 in the same direction as said shaft rotates with the wheel 119, any rotary movement of the shaft 121 will also cause the tube 179 to rotate therewith, unless the free end of spring is held back, the holding back of said free end tending to open up the spring, and prevent it from grasping, or being contracted upon the shaft 121. If the free end of the spring is not so held back, then any frictional contact between the spring 177 and the shaft 121 will increase if the tube 179 does not turn with the shaft, and such increase of frictional contact will have the effect of causing the spring 177 to grasp or clutch the shaft 121, and eventually produce an absolutely tight connection between the shaft 121 and the tube 179 thereon.

Figure 16:
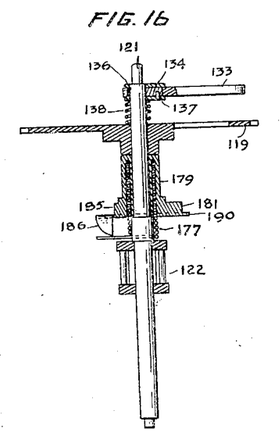
Fig. 16 is a sectional detail view, showing parts of the setting mechanism.

At the commencement of the winding motion, at 12 o'clock of each day, the projecting free end of the spring 177 will be found to have just escaped a tooth 180 extending forwardly from an arm 182 secured to the arm 83 which forms part of the half-hour striking mechanism. Immediately upon the commencement of the winding motion, the projecting free end of the spring 177 will travel with the wheel 119, since it is free to so move, until it is brought up against the finger 176, where it remains until two minutes after 12. At two minutes after 12, as known by a standard clock, an operator at the central power station, (or at an intermediate point), momentarily opens and closes the circuit. The opening of the circuit permits the spring 169 to instantly withdraw the armature 164, (Figs. 12, 14) away from the field magnets, and the immediate closing of the circuit causes the armature 164 to again resume its former position with such velocity that the finger 176, (Fig. 22) on the end of the spring arm, which, in the normal position of the armature 164, (Figs. 12, 14) was in a position arresting the projecting free end of the spring 177, then swings onward by its momentum, since the arm 173 is a spring arm, so as to allow the free end of the spring 177 to escape, which it immediately does, since it has been placed under tension by reason of the opening out of said spring. The escape of the spring 177 allows the cam 181 to revolve with the wheel. Said cam 181 consists of a disk portion having a part thereof cut away, so as to form a straight side 185, and of a flange portion 190, said flange being comparatively narrow around the circular portion of the disk, but wide adjacent to the straight portion thereof, and being cut from the periphery inward in a direction parallel to said straight portion, as shown at 184, and the smaller cut portion thereof being bent out of the plane of the remainder of the flange portion of the cam, as shown at 186, (Fig. 16). When said cam revolves, for the reason just described, its bent portion 186 engages an end piece 187, (Figs. 12, 14, 17) on the spring arm 161, and moves it rearwardly on to the main part of the flange portion of the cam. Said end piece 187, when it is moved rearwardly on to the main part of the flange portion 183, is first engaged by the straight edge 185 of the disk portion of the cam, but, as said cam rotates, said end piece 187 is thereby moved outwardly, engaging the circular edge of the cam. This outward movement has the effect of turning the shaft 159, thereby drawing the arm 150 from the braking wheel 151 to a sufficient distance to release the gear wheel 143, and permit said gear wheel to rotate under the action of the main setting spring 142. Said setting spring thereupon immediately acts to rotate said gear wheels 144 and 146. As the gear wheels 144, 146, rotate, a cam 188, secured to the gear wheel 144, engages a finger 189 extending from an arm 191 secured to the shaft 159 carrying the braking arm 150 and rocks the same, so that the end piece 187 attached to the end of the spring arm 161 is moved so far as to clear the flange portion 183 of the cam and leave the same. Thereupon the spring in said arm 161 moves said end piece forwardly to its original plane, from which it was moved rearward by the forwardly bent part 162 of the flange portion of the cam. Said end piece 187 is now in such a position that the coiled spring 162 can rock the shaft 159 to cause the braking arm 150 to engage the brake wheel 151 as soon as the cam on the wheel 144 has left the finger 189.

It will thus be seen that it is impossible for the wheels 144 and 146 to revolve more than once each day, at two minutes after 12. In about a second from the release of the projecting free end of the spring 177 from the finger 176, said free end arrives at the tooth 181 projecting forwardly from the arm 83 forming part of the half-hour striking train, at which point it is arrested, so that it is impossible for the setting mechanism to be operated again until the next day during the interval between 12 and four minutes after 12, because the setting mechanism is only operated when the clock is being wound, and this can only be done between 12 and 12.04.

At 12.30 the operation of the half-hour striking train releases the projecting free end of the spring 177, which, being under tension, immediately springs forward, and remains in a position just in advance of the tooth 181, when said tooth returns to its normal position, that is, the spring 177 remains in the position from which it originally started, for about 23 hours and 32 minutes.

It will be seen from the above construction that the switch is held closed by the time train for a period of time which is on an average 4 minutes. If the clock is 2 minutes fast then it will be held closed for a period of 6 minutes, and if it is 2 minutes slow, then it will be held closed for a period of only 2 minutes, and in general, the switch will be held closed for varying periods depending upon the extent to which the clock is fast or slow. It will be seen that should the voltage become so low as to fail to start the motor, no damage to the field and armature windings can be done, as the switch is automatically opened at 4 minutes after 12 in case the clock was not synchronized.

I claim:

In an electrically wound and synchronized clock, the combination of a spring for imparting motion to the clock mechanism, a spring for imparting motion to the synchronizing mechanism, a motor for winding said springs, a switch for closing the circuit through said motor, means whereby a temporary interruption of current through said motor synchronizes the clock, and further means whereby a second interruption of current will not again affect the synchronizing mechanism until the next predetermined time for synchronizing.

A. R. NELSON.